(12) United States Patent
Siegel

(10) Patent No.: US 9,115,687 B2
(45) Date of Patent: Aug. 25, 2015

(54) EFFICIENT WAVE ENERGY CONVERSION USING CYCLOIDAL TURBINES

(75) Inventor: Stefan G. Siegel, Pueblo, CO (US)

(73) Assignee: Atargis Energy Corporation, Pueblo, CO (US)

( * ) Notice: Subject to any disclaimer, the term of this patent is extended or adjusted under 35 U.S.C. 154(b) by 678 days.

(21) Appl. No.: 13/405,267

(22) Filed: Feb. 25, 2012

(65) Prior Publication Data

US 2013/0226349 A1 Aug. 29, 2013

(51) Int. Cl.
*G05D 3/12* (2006.01)
*F03B 13/18* (2006.01)
*F03B 15/00* (2006.01)

(52) U.S. Cl.
CPC .............. *F03B 13/183* (2013.01); *F03B 15/00* (2013.01)

(58) Field of Classification Search
CPC .............. G05D 3/12; B63B 1/24; B63B 1/26; B63B 1/28; B63B 1/30; F03B 13/183; F03B 15/00
USPC ......... 700/275; 290/42, 53, 54; 114/244, 274, 114/275, 276, 278, 280, 282, 39.15, 39.24, 114/55.54
See application file for complete search history.

(56) References Cited

U.S. PATENT DOCUMENTS

| | | | | |
|---|---|---|---|---|
| 3,802,368 A | * | 4/1974 | Henkel | 114/276 |
| 4,208,980 A | * | 6/1980 | Henkel | 114/274 |
| 5,398,628 A | * | 3/1995 | Rethorst | 114/62 |
| 5,582,123 A | * | 12/1996 | Rethorst | 114/62 |
| 6,164,235 A | * | 12/2000 | Hoppe | 114/275 |
| 6,880,477 B2 | * | 4/2005 | Royle | 114/67 R |
| 6,904,864 B2 | * | 6/2005 | Re et al. | 114/368 |
| 7,298,056 B2 | * | 11/2007 | Gizara | 290/54 |
| 7,420,287 B2 | * | 9/2008 | Smushkovich | 290/42 |
| 7,791,214 B2 | * | 9/2010 | Hill | 290/54 |
| 8,264,093 B2 | * | 9/2012 | Moore | 290/42 |
| 8,581,432 B2 | | 11/2013 | Rohrer | |
| 8,587,139 B2 | * | 11/2013 | Gerber | 290/42 |
| 8,604,631 B2 | | 12/2013 | Rohrer | |
| 8,614,520 B2 | | 12/2013 | Rohrer | |
| 8,686,582 B2 | * | 4/2014 | Gardiner et al. | 290/53 |
| 8,841,788 B2 | * | 9/2014 | Sampaio | 290/42 |
| 2007/0228736 A1 | * | 10/2007 | Smushkovich | 290/42 |
| 2009/0309366 A1 | * | 12/2009 | Moore | 290/53 |
| 2010/0140944 A1 | * | 6/2010 | Gardiner et al. | 290/53 |
| 2010/0148504 A1 | * | 6/2010 | Gerber | 290/42 |
| 2012/0153624 A1 | * | 6/2012 | Sampaio | 290/53 |

OTHER PUBLICATIONS

Siegel, Stefan G., Tiger Jeans, and Thomas McLaughlin. "Intermediate ocean wave termination using a cycloidal wave energy converter." ASME 2010 29th International Conference on Ocean, Offshore and Arctic Engineering. American Society of Mechanical Engineers, 2010.*

(Continued)

*Primary Examiner* — Charles Kasenge
(74) *Attorney, Agent, or Firm* — David Millers

(57) ABSTRACT

A single-blade or double-blade cycloidal turbine can operate as a wave generator or a wave energy converter. Efficient operation techniques can adjust a pitch angle, a radial size, and/or a depth of the cycloidal turbine according to the height and wavelength of an incoming wave. The rotation of the cycloidal turbine can be controlled so that a rotational period of the cycloidal turbine matches the period of the wave and so that a target difference is maintained between a rotation angle of the cycloidal turbine and a phase angle of the wave.

22 Claims, 7 Drawing Sheets

(56) References Cited

OTHER PUBLICATIONS

Jeans, Tiger, et al. "Irregular deep ocean wave energy conversion using a cycloidal wave energy converter." 9th European Wave and Tidal Energy Conference (EWTEC), Southampton, UK, Sep. 5, 9, 2011.*

Siegel, Stefan G., et al. "Experimental wave generation and cancellation with a cycloidal wave energy converter." ASME 2011 30th International Conference on Ocean, Offshore and Arctic Engineering. American Society of Mechanical Engineers, 2011.*

Duarte, Tiago M. "Experimental Study of a 2D hydrofoil for application in ocean mooring systems."*

Hermans, A.J. et al., "A Device to Extract Energy From Waves" Applied Ocean Research Computational Mechanics Publications (1990) vol. 12, No. 4, pp. 175-179.

Marburg, C., "Investigation on a Rotating Foil for Wave Energy Conversion" Report 1000-S, Master's thesis, Delft University of Technology, Delft, The Netherlands (1994) pp. 1-105.

Pinkster, J. et al., "A Rotating Wing for the Generation of Energy From Waves" In: 22nd IWWWFB Conference, Plitvice, Croatia (2007) pp. 165-168.

Siegel, S.G. et al., "Deep Ocean Wave Energy Conversion Using a Cycloidal Turbine", Applied Ocean Research (2011) 33:110-119.

Van Sabben, E., "De in het snelheidsveld van lopende golven ronddraaiende plaat; invloed op het vrije vloeistofoppervlak" Master's thesis, Delft University of Technology, Delft, The Netherlands (1987) pp. 1-89.

* cited by examiner

EFFICIENT WAVE ENERGY CONVERSION USING CYCLOIDAL TURBINES

BACKGROUND

Wave power is one of the most abundant, clean, and renewable energy sources on Earth. The World Energy Council has estimated the world wide annual amount of wave power energy at 17.5 PWh. This is comparable to annual worldwide electric energy consumption, which is currently estimated at 16 PWh. Thus, wave power has the potential to provide a large portion of the world's electric energy needs if wave power can be tapped efficiently. In addition to abundance, wave power has several other advantages when compared to some of the other clean and renewable energy sources. For example, wave power has a relatively high power density. While the power density of both solar and wind power in typical favorable sites may be of the order of 1 kW/m$^2$, wave power in a typical North Atlantic wave (wave height of H of about 3.5 m and period of T of about 9 s) yields 108 kW per meter of wave crest. A wave energy converter extending about 40 m in the vertical direction could yield a power density of about 2.7 kW·m$^{-2}$ if the wave power is efficiently extracted, e.g., near 100% energy conversion. Wave power systems could thus produce more than twice the power per system area that wind or solar power systems could produce operating at 100% conversion efficiency. However, most clean energy sources have far less than 100% energy conversion efficiency. For example, a theoretical limit for conversion of wind power is believed to be around 59%. If wave power conversion can be made close to 100% efficient, the accessible power density of waves can be greater by a factor of more than four when compared to wind power, even if wind energy conversion operates near its theoretic efficiency limit. Furthermore, wave energy is commonly available on a more consistent basis and can be better predicted in advance than can wind energy, reducing the need for backup power sources. Finally, since a large portion of the world's population lives close to ocean shores, the distance between energy production and consumption may be small for wave power, reducing transmission losses. Wave power may thus be an excellent solution for providing clean, renewable energy to densely populated coastal areas.

SUMMARY

A lift based wave energy converter, e.g., a cycloidal turbine, may employ one or more shafts with respective hydrofoils attached eccentrically at a radius. In operation, the main shaft is aligned parallel to the wave crests and submerged at a fixed depth. In accordance with an aspect of the invention, structural and operational parameters such as converter size, submergence depth, and number of hydrofoils can be selected to improve performance and particularly to improve the efficiency of conversion of wave energy into a more useable form. For optimal parameter choices, inviscid energy conversion efficiencies of more than 99% of the incoming wave energy to shaft energy may be achieved using feedback control to synchronize the rotation of the wave energy converter with the period and phase of incoming waves, adjust blade pitch angles according to the height of the incoming wave, and/or control the radial offset of the blade or blades according to the height of the waves. Further, a relatively simple pitching strategy can keep a blade fixed at a pitch angle selected for the wave height, and employ exactly two blades mounted on opposing arms with each blade at a pitch angle that is the negative of the pitch angle of the other blade. Such a configuration and operation can achieve a nearly 100% wave energy conversion from Airy waves, which closely approximate deep ocean waves. An effective complete termination of an incoming wave can be achieved with little energy being lost to harmonic waves traveling in the up-wave and down-wave directions.

One specific embodiment of the invention is a method for operating a wave energy converter. The method includes measuring a period and a phase of incoming waves and controlling rotation of a hydrofoil that is mounted on the wave energy converter at an offset from a rotation axis of the wave energy converter. Rotation control includes controlling the rotation angle of the blade, e.g., using a feedback loop, so that a difference between the phase of the incoming wave and the rotation angle is equal to a target difference, e.g. 180°. Rotation can also be controlled so that the period of rotation of the wave energy converter is equal to the period of the wave. The pitch angle of the blade may be mostly held constant with periodic adjustments for changes in the incoming waves. Similarly, the radial offset and the depth of the wave energy converter can be adjusted periodically for changes in the waves to maintain efficient wave energy conversion.

Another specific embodiment of the invention is a wave energy converter system. The system includes a sensor system, a main shaft, and one or two hydrofoils mounted on the main shaft at respective offsets. Each hydrofoil has a mounting that permits control of the pitch angle of the hydrofoil. A sensor system is positioned to measure incoming waves, for example, to measure the period, phase, and height of incoming waves. A control system can be configured to control rotation of the main shaft so that a difference between the phase of the incoming wave and a rotation angle of the first hydrofoil is equal to a target difference. The control system can also control the pitch angle of one or more hydrofoils, the depth of the main shaft, and the radial offset of each blade to adjust for changes in the incoming waves.

BRIEF DESCRIPTION OF THE DRAWINGS

Use of the same reference symbols in different figures indicates similar or identical items.

DETAILED DESCRIPTION

A cycloidal wave energy converter or turbine can be operated to achieve high efficiency in converting the power of ocean waves, particularly Airy waves, into the shaft rotation power, e.g., for an electrical generator. In particular, the radial size and depth of a single-blade or double-blade cycloidal wave energy converter (CycWEC) can be adjusted according to the height of incoming ocean waves, so that rotating the CycWEC at a constant angular velocity generates an Airy wave form. The pitch angle of the CycWEC can then be adjusted so that a height of the generated wave matches the incoming wave, and the rotation of the CycWEC can be controlled so that the generated wave fully or almost fully cancels out the incoming wave. As a result, all or a high percentage of the power in the incoming wave is absorbed by the operation of CycWEC and available for operation of an electric generator or other useful tasks.

Figure 1:
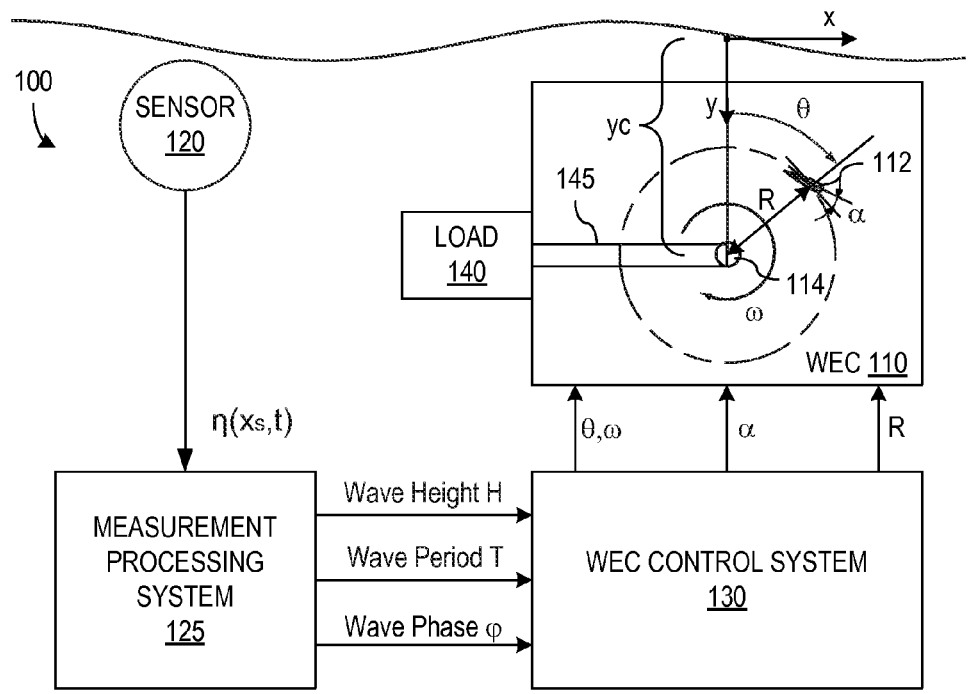
FIG. 1 illustrates a wave energy conversion system employing a cycloidal wave energy converter with a single hydrofoil or blade.

FIG. 1 shows a wave energy converter (WEC) system 100 employing a CycWEC 110. CycWEC 110 includes a single hydrofoil 112 attached parallel to a horizontally oriented main shaft or axis 114 at a radial offset R. In the illustrated configuration of FIG. 1, an ocean wave traveling to the right tends to rotate CycWEC clockwise about axis 114. By convention, a rotation angle $\theta$ and an angular velocity $\omega$ of CycWEC 110 in the configuration of FIG. 1 are positive in the clockwise direction. Main axis 114 of CycWEC 110 is submerged a depth yc below the surface of the water, which is measured relative to an origin (y=0) of a Cartesian coordinate system on the undisturbed free surface of the ocean. As another convention used herein, the Cartesian coordinate system for system 100 in ocean waves can be defined having an x axis in the direction of wave propagation, y axis directed down into the ocean, and a z axis extending perpendicular to the x and y directions. Typically, the wave front for ocean waves would thus extend in the z direction.

Rotation angle $\theta$ gives the angular position of hydrofoil 112 about main axis 114. FIG. 1 illustrates the particular example of a single hydrofoil 112. A CycWEC could more generally include multiple hydrofoils mounted in a similar manner to hydrofoil 122, and the additional hydrofoils may be at a fixed angular offset from hydrofoil 112. Each hydrofoil 112 would generally have a large aspect ratio, which is the ratio between the span and the cord length, and in operation, system 100 aligns the span of hydrofoil 112 parallel with the incident wave crests. A pitch angle $\alpha$ gives the orientation (pitch) of hydrofoil 112 and is measured relative to a tangent to the circular path that hydrofoil 112 follows during operation of CycWEC 110. Pitch angle $\alpha$ may be adjusted, for example, to produce a desired level of circulation $\Gamma$, which is an indicator of the magnitude of the interaction of hydrofoil 112 with surrounding water. Circulation $\Gamma$ is defined herein by the product Uinf*c*$\pi$*$\alpha$, where Uinf is the freestream velocity [m/s] (which is the velocity that the hydrofoil encounters), c is the chord length of hydrofoil 112 [m], $\pi$ is the mathematical constant (ratio of the circumference to diameter of a circle), and $\alpha$ is the pitch angle in [rad]. Circulation $\Gamma$ may thus have units of $m^2/s$.

A function $\eta(x,t)$ can describe the elevation of the ocean surface and therefore the waves incident on system 100. At any point x on the ocean surface, the vertical elevation $\eta$ has a peak-to-trough wave height H. With the orientation of FIG. 1, waves are assumed to travel left to right, and a sensor system 120 may be positioned to measure the elevation of the ocean surface at a location or locations (e.g., at Xs<0) up-wave of WEC 110. A measurement processing system 115 can use the measurements and known operating parameters of system 100 to predict elevation 11 at the location (e.g., at x=0) of WEC 100 in advance, and a WEC control system 130 can employ the measurements or calculations from measurement processing system 125 to control the operation of WEC 110. For example, measurement processing system 125 can generate values of wave height H, wave period T, and wave phase $\phi$ as a function of time, and WEC control system 130 can control operating parameters of WEC 110 such as rotation parameters $\theta$ and $\omega$, pitch angle $\alpha$, and radial offset R. Measurement processing system 125 and WEC control system 130 can be implemented using specialized hardware or using one or more general purpose computers with appropriate software.

Mechanical systems in WEC 110 that permit the desired pitch control of hydrofoil 112 can include servo or actuator systems able to rotate hydrofoil 112 relative to a pitch axis that is parallel to main axis 114 and radially offset from main axis 114 by distance R. Some suitable systems are described in U.S. Pat. No. 7,686,583, entitled "Cyclical Wave Energy Converter," which is hereby incorporated by reference in its entirety. In a one configuration, hydrofoil 112 can be mounted on a structure such as an arm or disc extending outward from main axis 114, and the structure may be either fixed, if control of offset R is not employed, or may include hydraulic or other systems that allow extension and contraction of offset R. Rotational parameters $\theta$ and $\omega$ may be controlled through a load 140 coupled to axis 114. Load 140 may include an electric generator or other energy conversion system connected through a mechanical transmission 145 to main shaft 114. Load 140 may provide braking using reactive torques arising during generation of electrical power, or load 140 may even include motorized drive systems could that could be employed is some circumstances to control rotation of hydrofoil 112 about main shaft 114.

Figure 2:
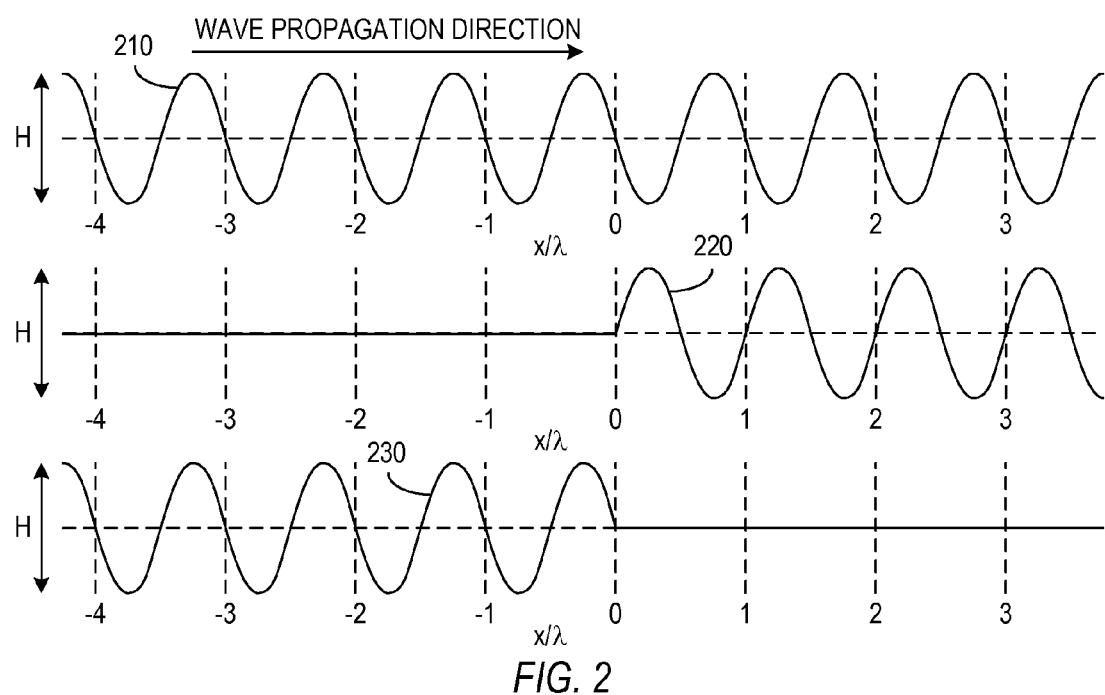
FIG. 2 illustrates relationships between an incoming wave and a generated wave that is associated with operating a wave energy converter to provide 100% efficiency in conversion of wave energy.

Operation of WEC 110 for production of wave energy may optimally extract 100% of the energy from incoming ocean waves. FIG. 2 illustrates a basic process for optimal efficiency of wave energy conversion. In particular, an ocean wave at a particular time (e.g., t=0) may be represented by a wave form 210. Waveform 210 has the general form of an Airy wave. An Airy wave is basically sinusoidal and does not represent effects such as breaking waves but is generally accurate or a good approximation of deep ocean waves of moderate wave height. A WEC such as WEC 110 of FIG. 1 can be operated to generate waves traveling in the direction of an incoming wave. Wave form 220 represents an ideal generated wave for the purpose of wave energy conversion. Waveform 220 particularly represents a form generated by a WEC positioned at the origin (x/$\lambda$=0) where all of the wave energy travels in the down-wave direction and none of the wave energy travels in the up-wave direction. (In FIG. 2, waves traveling toward greater values of coordinate x are considered as traveling down-wave, and waves traveling in the opposite direction are considered as traveling up-wave.) Further, the portion of wave 220 with non-zero height has the same period and amplitude as the ocean wave 210 but is 180° out of phase with ocean wave 210. A waveform 230 represents the sum of incoming wave 210 and generated wave 220. As can be seen in FIG. 2, none of the energy in incoming wave 210 passes the WEC, i.e., the wave terminates at x=0. Accordingly, all of the wave energy is converted to some other form if the ocean wave has the form 210 and operation of the WEC would generate wave 220 in still water.

Figure 3A:
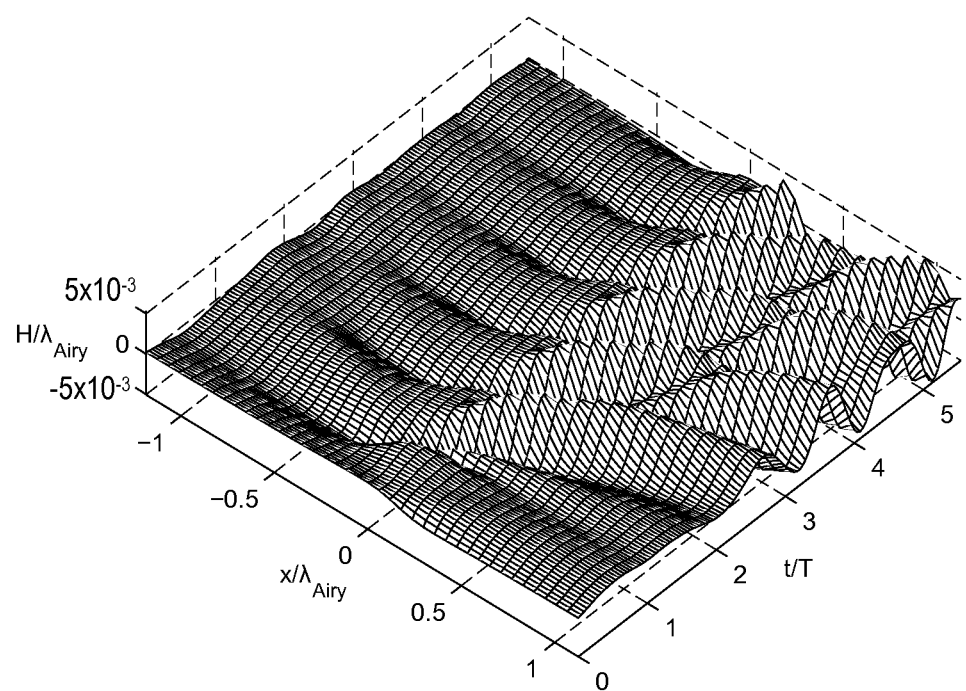
FIG. 3A illustrates a typical generated wave produced by operation of a single-blade cycloidal wave energy converter.

Efficient wave energy conversion can be achieved by operating a WEC such that such rotation and pitching the hydrofoils would generate a wave that fully cancels the incoming ocean waves. Determining a strategy that achieves optimal cancelation can be complex. One relatively simple strategy for operation of a CycWEC is to keep the pitch angle α constant throughout the rotation of the CycWEC. FIG. 3A represents a typical wave generated by operation of a single-blade WEC such as WEC 110 of FIG. 1 when hydrofoil 112 is maintained at a fixed pitch angle α and rotated at a uniform angular velocity ω. (Generation of waves of the type illustrated in FIG. 3A is further described by S. G. Siegel, T. Jeans, and T. E. McLaughlin, "Deep ocean wave energy conversion using a cycloidal turbine," Applied Ocean Research 33 (2011), pp. 110-119, which is hereby incorporated by reference in its entirety.) The spectral content of the generated wave primarily depends on the depth yc and the radial offset R relative to the wavelength. One desirable configuration sets depth yc at the minimal depth that will keep the hydrofoil submerged, so that the WEC is most effective at generating surface waves and absorbing energy from surface waves. With this restriction placed on depth yc, the spectral content of the generated wave primarily depends on radial offset R. For a wavelength $\lambda_{Airy}$, the radial size of WEC 110 in the example of FIG. 3A is such that $2R/\lambda_{Airy}=0.3$ and the submergence depth is $|yc|/\lambda_{Airy}=0.18$, which avoids generating excessively large harmonic waves as described further below.

Figure 3B:
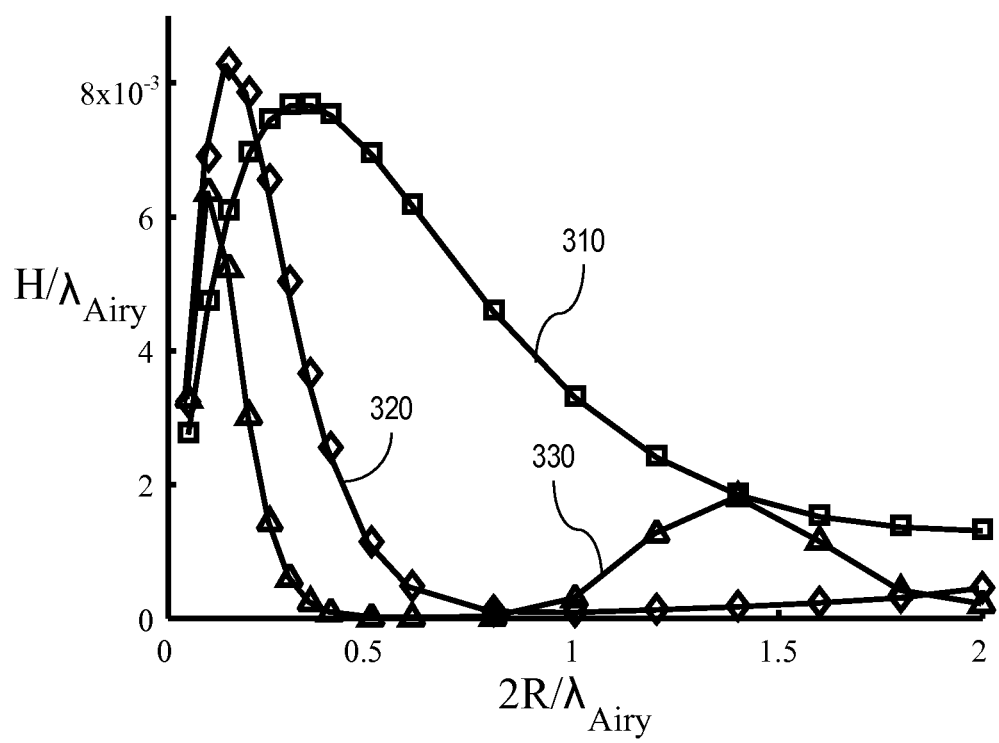
FIGS. 3B and 3C show plots indicating the dependence of the relative height of spectral components of a generated wave on the radial size of a single-blade cycloidal wave energy converter.
Figure 3C:
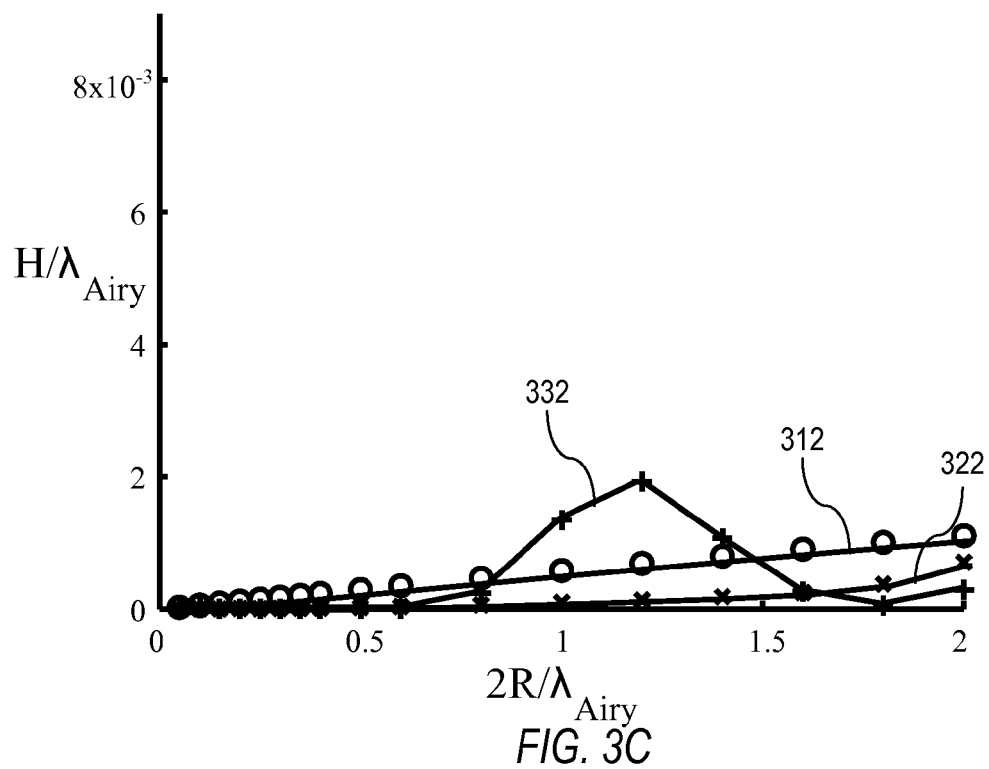

FIG. 3A shows a generated wave that primarily oscillates with time t at a period corresponding to the period T of rotation of the WEC, but the generated wave also includes contributions from harmonic waves traveling in both the up-wave and down-wave directions. FIGS. 3B and 3C show dependences on the radial offset R of the relative wave heights of the fundamental and next two harmonic waves traveling in the down-wave and up-wave directions, respectively. In particular, plot 310 in FIG. 3B shows the relative magnitude of the desired fundamental wave having period T and traveling in the down-wave direction. Plots 320 and 330 show the relative magnitudes of the harmonics having respective periods T/2 and T/3 and traveling in the down-wave direction. A desirable configuration results when the fundamental harmonic 310 dominates higher harmonics 320 and 330, which primarily occurs when radial offset R is between about 0.2 and 0.5 of the wavelength and particularly when radial offset is about 0.4 of the wavelength of the incoming waves. FIG. 3C shows the relative heights of the up-wave components. Plots 312, 322, and 332 respectively show the relative heights of components having periods T, T/2, and T/3 and traveling in the up-wave direction. Minimizing all of these components is generally desired, which generally suggest using a smaller radial offset R. However, these components are small compared to desired fundamental component (e.g., plot 310) at radial offsets up to at least 0.4. Accordingly, a single-blade WEC may provide best performance with a radial offset that is set or adjusted to be between about 0.2 and 0.4 of the wavelength of the incoming wave.

Inspection of the down-wave traveling wave heights in FIG. 3B reveals maxima when the hydrofoil rotational speed and resulting wave speed C are equal (i.e., ωR=C assuming Airy wave theory). For the fundamental wave, this corresponds with $2R/\lambda_{Airy}=1/\pi$, which is the optimal device size for wave generation. It is also important to note that the amplitude of the second and third harmonic waves is significant with maximum values similar to the fundamental harmonic. As a result, the optimal efficiency does not coincide with the optimal device size for wave generation and has a relatively limited bandwidth with power ratios near unity for $0.5 \leq 2R/\lambda_{Airy} \leq 0.75$.

Figure 3D:
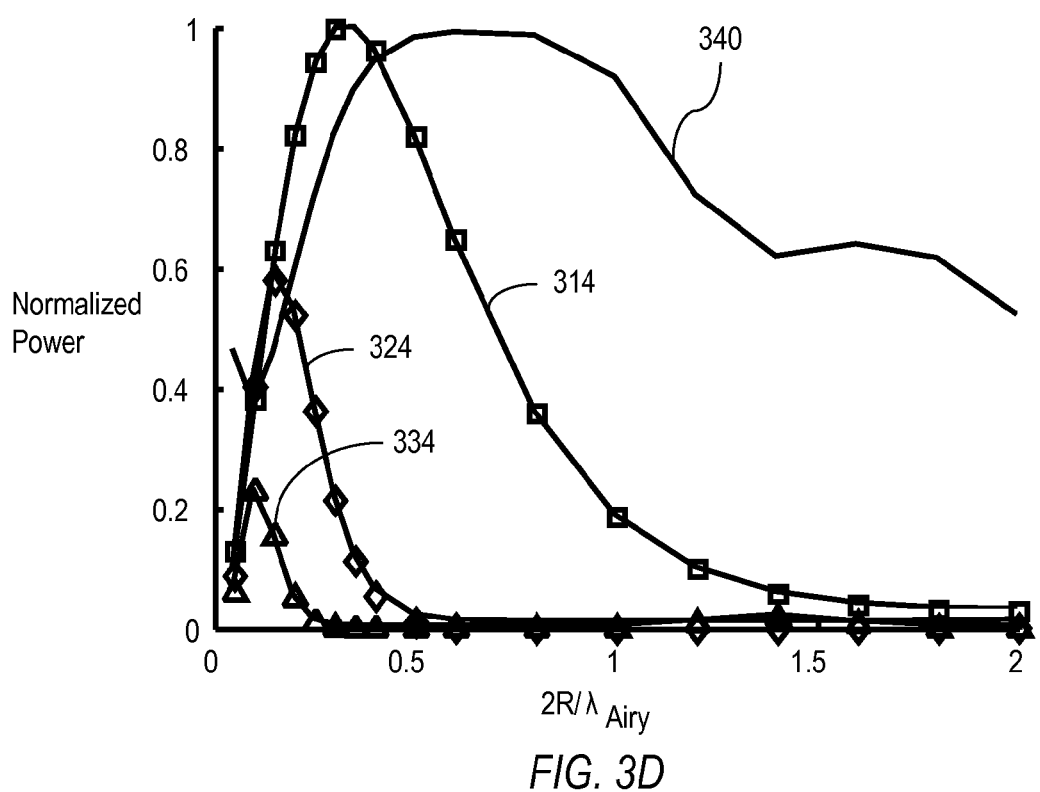
FIG. 3D shows plots of the relative power in spectral components of a wave generated by a single-blade cycloidal wave energy converter.

FIG. 3D shows the relationship of the relative power in spectral components of a wave generated by a single-blade WEC. In particular, plots 314, 324, and 334 represent the power respectively in the fundamental wave, the first harmonic, and the second harmonic. A plot 340 shows the ratio of the power in the desired fundamental wave to the total power in all waves and indicates the efficiency with which a single-blade WEC can extract energy from an incoming wave. As shown, conversion efficiency above 90% can be achieved with a single-blade WEC having radial offset R in a range from about 0.2 to 1.2 times the fundamental wavelength $\lambda_{Airy}$. In general, smaller sizes, e.g., small radial offsets R, for a WEC system may be desirable particularly because of the lower cost of producing a smaller system.

Figure 4:
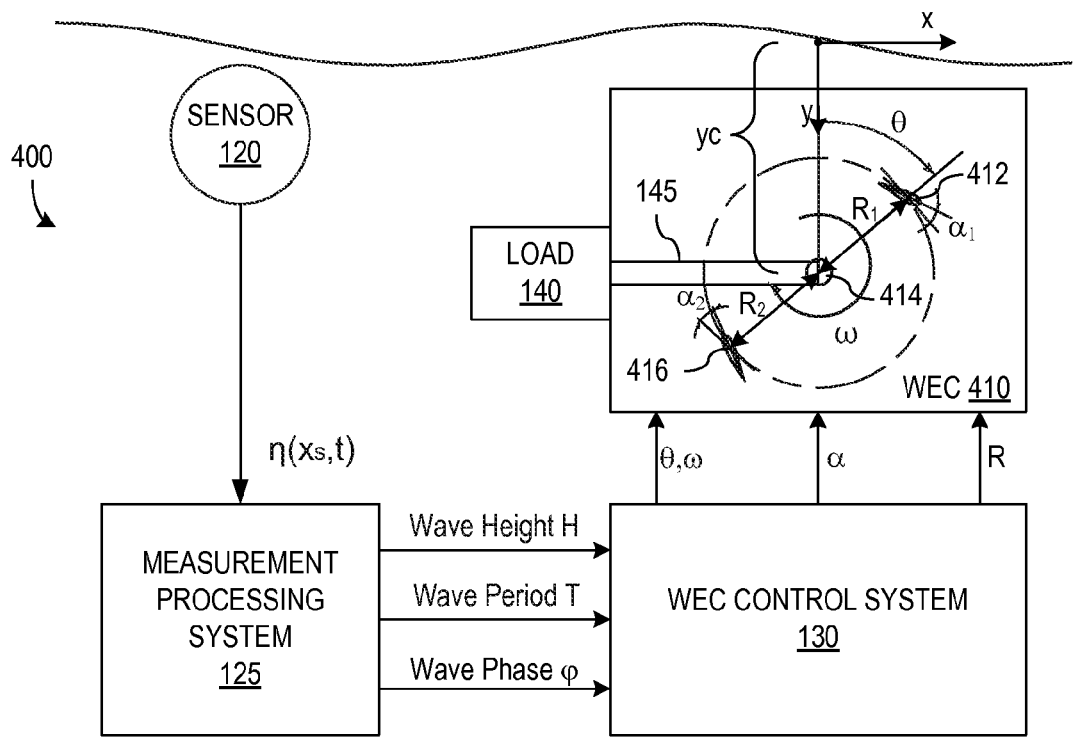
FIG. 4 illustrates a wave energy conversion system employing a cycloidal wave energy converter with a pair of hydrofoils at opposing radial offsets.

FIG. 4 shows another embodiment of a wave energy converter system 400. WEC system 400 may be similar or identical to the above-described WEC system 100 of FIG. 1, except that WEC system 410 includes a double-blade CycWEC 410, which includes a pair of blades or hydrofoils 412 and 416. Hydrofoils 412 and 416 may be substantially identical to hydrofoil 112 of FIG. 1, but hydrofoils 412 and 416 are mounted on opposite sides of main shaft or axis 414, i.e., at rotation angles that are 180° apart. Each hydrofoil 412 and 416 may be otherwise independently operated. For example, blades 412 and 416 have respective pitch angles $\alpha_1$ and $\alpha_2$ and respective radial offsets $R_1$ and $R_2$ that may be independently controlled.

Figure 5A:
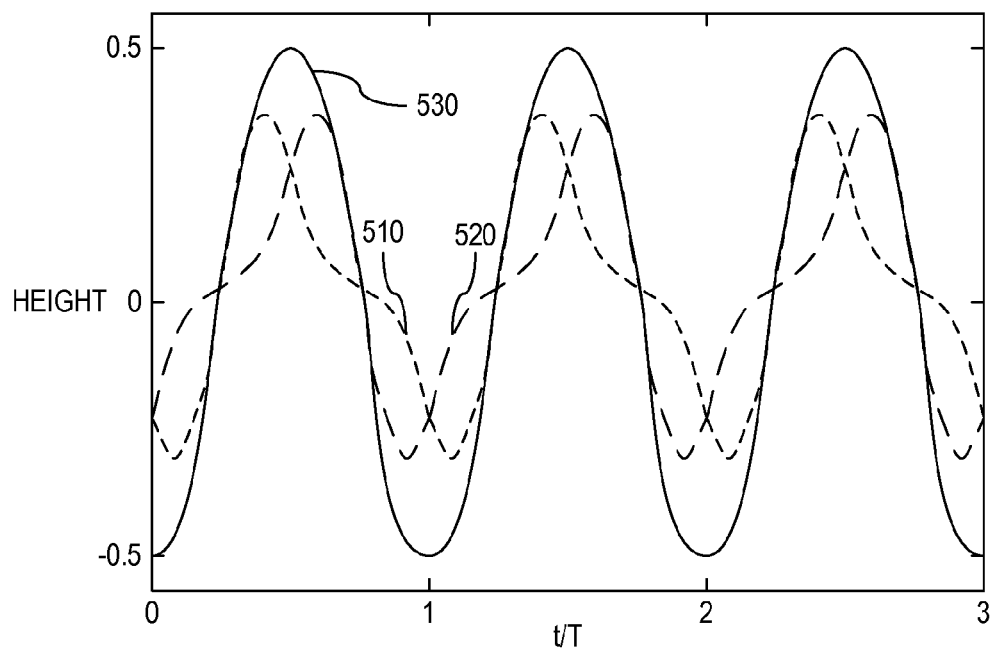
FIG. 5A shows waveforms illustrating how two waves generated separately by the blades in a double-blade cycloidal wave energy converter can combine to form an Airy wave.

With one operating strategy, WEC 400 is operated so that: the pitch angles $\alpha_1$ and $\alpha_2$ are the negative of each other ($\alpha_1 = -\alpha_2$); radial offsets $R_1$ and $R_2$ are equal ($R_1 = R_2 = R$); and angular velocity w is constant. FIG. 5A illustrates waveforms 501 and 502 associated with the waves generated by hydrofoils 412 and 416 as WEC 410 rotates with constant velocity. Wave forms 501 and 502 have equal amplitudes since hydrofoils 412 and 416 are identical (e.g., have the same shape, cord, and span) and the magnitudes of pitch angles $\alpha_1$ and $\alpha_2$ are the same, but the difference in sign of pitch angles $\alpha_1$ and $\alpha_2$ and the 180° angular separation of hydrofoils 412 and 416 about main shaft 414 causes some higher order harmonics in generated waves 501 and 502 to cancel each other. As a result, WEC 410 can generate a wave 503, which is the sum of waves 501 and 502 and has nearly the desired form of an Airy wave.

Figure 5B:
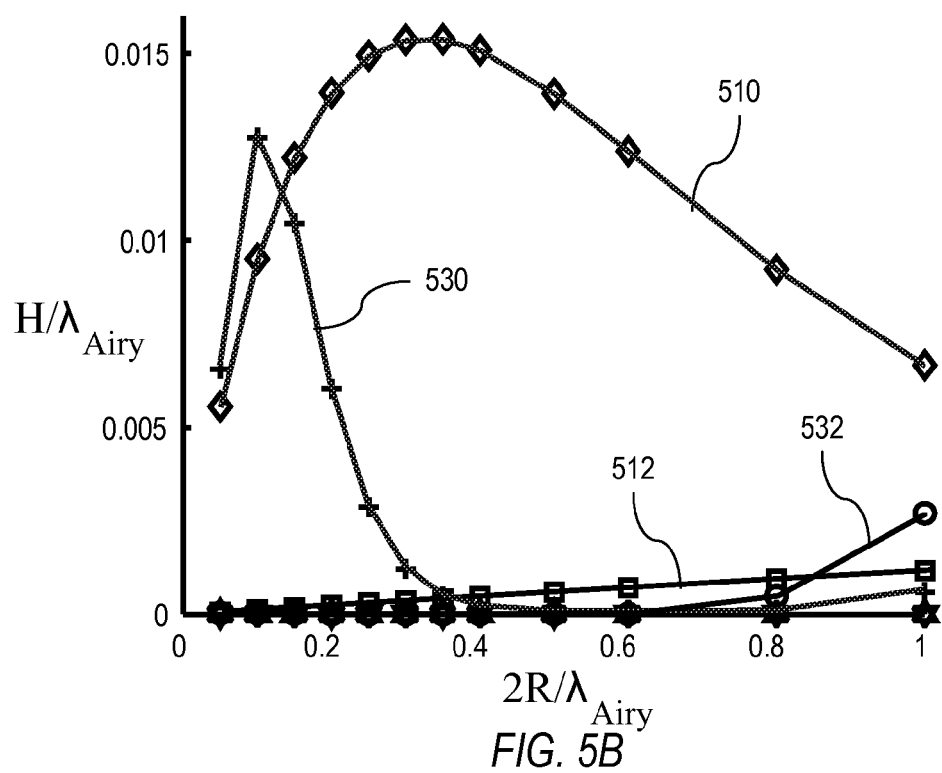
FIG. 5B shows plots indicating the dependence of the relative height of spectral components of a generated wave on the radial size of a double-blade cycloidal wave energy converter.

FIG. 5B illustrates the dependence on radial offset R of the relative magnitudes of the fundamental component and the first two harmonics of the generated wave from a double-blade CycWEC. Plot 510 particularly shows the relative magnitude of the desired fundamental harmonic, which has period T and travels in the down-wave direction. Plot 530 shows the relative magnitude of the third harmonic with period T/3 and traveling in the down-wave direction. Plots 512 and 532 show the relative magnitudes of fundamental and third harmonics travelling in the up-wave direction. The second harmonics traveling in both directions are negligible for double-blade WEC operated as described above. As can be seen from FIG. 5B, a most desirable operating regime for diameter 2*R is in a range from about 0.2 to 0.8 of the wavelength $\lambda_{Airy}$ of the generated wave, where the resulting generated wave is very close to an Airy wave. Operating WEC 410 in this regime and manner can provide nearly 100% conversion of an incoming Airy wave if the generated wave 530 is matched in period with the incoming Airy wave, has the same amplitude as the incoming Airy wave, and is 180° out of phase with the incoming Airy wave.

Figure 5C:
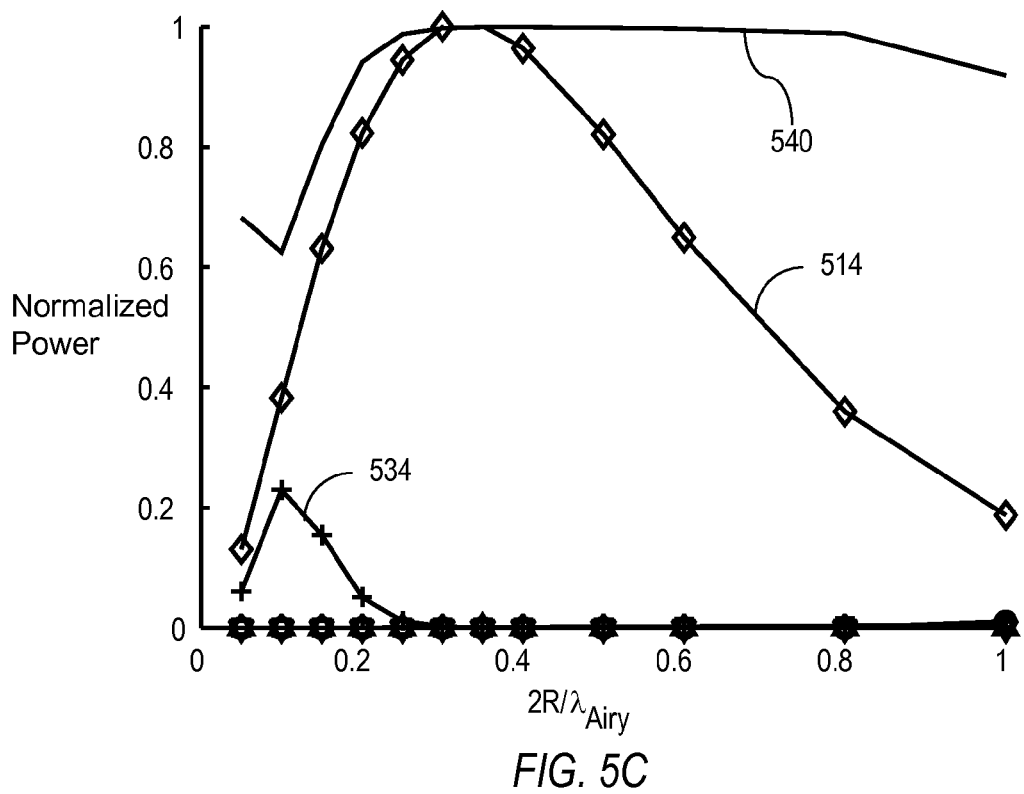
FIG. 5C shows plots of the relative power in spectral components of a wave generated by a double-blade cycloidal wave energy converter.

FIG. 5C shows plots 514 and 534 of the relative power respectively in the fundamental and third harmonic components of a wave generated using a double-blade WEC, and a plot 540 shows the ratio of power in the desired fundamental component to the total power in the wave. Plot 540 illustrates that good efficiency, e.g., above 60%, can be achieved with radial offset R anywhere in the plotted range, and efficiency above 90% can be achieved for diameter 2*R above about 0.15 of wavelength $\lambda_{Airy}$, e.g., $0.15 \leq 2R/\lambda_{Airy} \leq 1.0$. A double-blade WEC of a fixed size is thus able to interact efficiently with incoming waves. Since the power ratio is flat and close to unity for device size ranging from $0.2 \leq 2R/\lambda \leq 1.0$, one could, for example, design a double-blade WEC to efficiently interact with waves that differ in wave length by approximately a factor of five. For example, a double-blade WEC with R=20 m can efficiently interact with wave lengths between 40 m≤λ≤200 m, which is typical of deep ocean waves. While the WEC will still be able to extract a portion of the energy for waves outside of this design range, the efficiency will be reduced. This dynamic range should suffice for most wave climates found in actual deep ocean settings, negating the need to design a WEC with a variable radius which adds complexity to the design.

WEC system 400 of FIG. 4 can synchronize the period and the phase of the generated wave of WEC 410 through control of the rotational parameters θ and ω, e.g., through control system 130 operating load 140 or transmission 145. In particular, measurement processing system 125 can provide measured values for the incoming wave period T and phase φ. The phase of the wave at WEC 410 may differ from the measured phase because of the distance between sensor 120 and WEC 410, and the traveling speed (celerity C) of the wave. With the distance known and the wave period estimated, the phase of the wave at WEC 410 can be calculated from the measured phase, and a position angle θ can be determined that provides the desired difference between the phases of the incoming wave and the generated wave at WEC 410. In particular, rotation angle θ should be such that the generated wave is 180° out of phase with the incoming wave at WEC 410. WEC control system 130 can determine whether there is an error or difference between the desired and actual rotation angle θ. If necessary, WEC control system 130 can slow (or speed up) rotation of main axis 414 until rotation angle θ has the desired relationship with incoming waves. Once rotation angle θ is in the desired relation to the wave, WEC control system 130 can control a transmission, braking system, or motor coupled to main shaft 414 so that angular velocity ω is constant and provides WEC 410 with a period of rotation that matches the period of the incoming waves.

Figure 6:
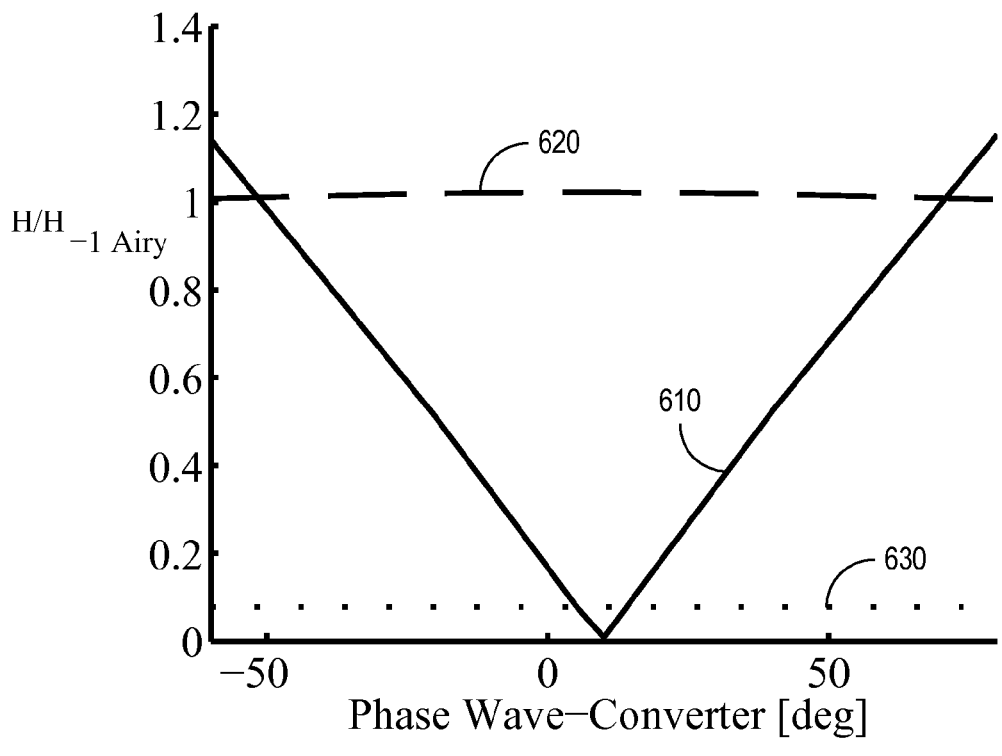
FIG. 6 shows plots illustrating dependence of the remaining height of an incoming wave on a difference between the phase of the incoming water wave and the rotation phase of a cycloidal wave energy converter.

FIG. 6 illustrates how the harmonic components resulting from combination of an incoming wave with a generated wave depend on the difference between the measured phase of the incoming wave and the rotation angle of the WEC. For FIG. 6, the position angle is 0 when the hydrofoil with negative pitch is directly above the main shaft. FIG. 6 particularly illustrates an example of a multi-blade WEC with device size $2R/\lambda_{Airy}$ of 0.3, minimum submergence depth $|yc|+R|/\lambda_{Airy}$ of 0.015, and circulation $\Gamma$ $T/\lambda^2_{Airy}$ of $\pm 5.6 \times 10^{-3}$, and an incoming Airy wave with a period T of 9 s and a wave height $H_{Airy}$ of 1.98 m. All waves are evaluated at position x of $\pm 3\lambda_{Airy}$ at time t/T of 30 after the start of the cycloidal wave energy converter. Also, the incoming wave height is equal to the generated wave height. FIG. 6 particularly shows a plot 610 of the wave height $H_1$ of the fundamental wave traveling in the down-wave, a plot 620 of the wave height $H_{-1}$ of the fundamental wave traveling up-wave, and a plot of the second harmonic wave height $H_{-3}$ traveling in the up-wave direction. These are the only harmonic components of any significant amplitude present in the combined wave field of a double-blade WEC. The optimal phase, θ=10°, corresponds to a fundamental down-wave height $H_1$=0, indicating that the incoming wave has been entirely canceled by the WEC. The particular value of 10° depends on the separation of the WEC from the measurement of the phase and on the convention of the negative pitch blade up at θ=0. If the phase at the WEC were used, ideal cancelation would occur at 0°, and if a different convention were used for measuring rotation angle θ ideal cancelation would occur at a target angle that depends on that convention. The down-wave fundamental height $H_1$ shows a strong linear relationship for feedback phases above and below the optimal angle, while there is very little impact on heights $H_{-1}$ and $H_3$. Thus, small phase shifts will cause major losses in conversion efficiency making a phase-locked feedback system desirable for efficient conversion. In system 400 of FIG. 4, sensing system 125 and WEC control system 130 cooperate to provide a phase-locked feedback system.

WEC control system 130, for optimal energy conversion efficiency, also controls WEC 410 so that the "generated wave" has the same height H or amplitude H/2 as the incoming wave. The height of the generated wave depends on factors such as the depth yc of main axis 414, the radial offset (R=$R_1$=$R_2$), and circulation F of hydrofoils 412 and 416, which depends on the cord length and pitch angle magnitude ($\alpha=|\alpha_1|=|\alpha_2|$) as indicated above. WEC system 400 may allow for adjustment of depth yc, radial offset R, and pitch angle α, which enables selection of the height H of the generated wave. In other embodiments, one or two of depth yc, radial offset R, and pitch angle α may be fixed or controlled to achieve other goals such as controlling the shape of the generated wave, e.g., minimizing undesired spectral components.

Depth yc needs to be at least large enough that the WEC remains submerged, e.g., |yc|>R+½H for a double-blade WEC or |yc|>R−½H for a single-blade WEC. Otherwise, the height of the generated wave generally decreases with increasing depth yc. But importantly, the amplitudes of higher order harmonics traveling down-wave decrease at faster rates than does the amplitude of the fundamental harmonic. As a consequence, the ratio of power in the desired fundamental harmonic to power in other harmonics improves with increasing submergence depth yc and asymptotically reaches a value of one at |yc|/λ≥0.255. However, for this submergence, the fundamental down-wave amplitude has decreased by more than 40%, so that generating a wave of particular height requires a relatively larger circulation Γ.

Figure 7:
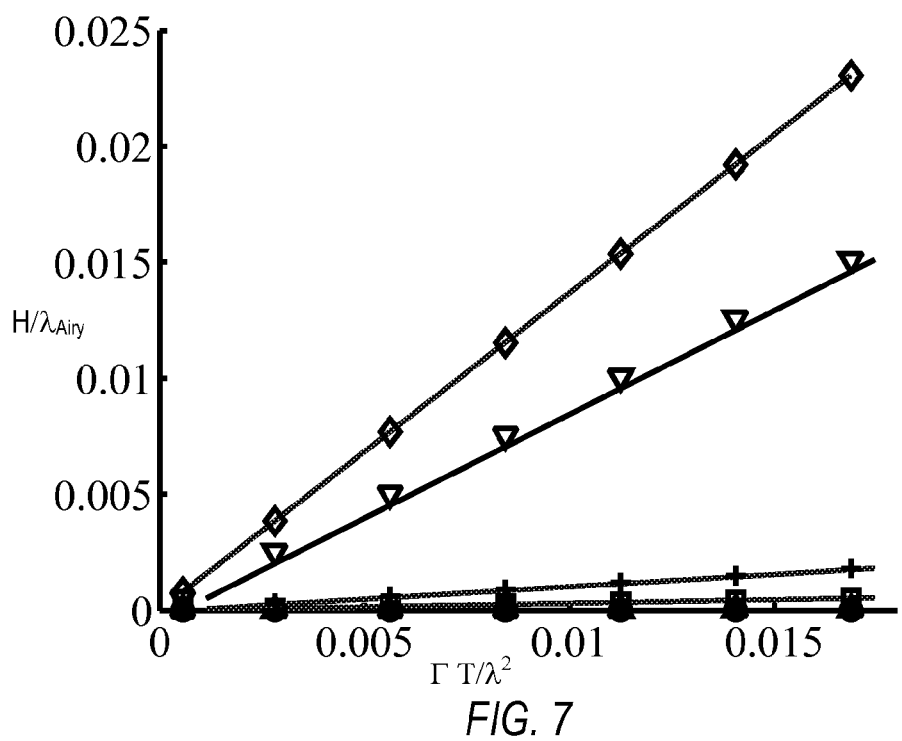
FIG. 7 shows plots indicating the dependence of the relative height of spectral components of a generated wave on the circulation of blades in a double-blade cycloidal wave energy converter.

The prescribed circulation affects the necessary hydrofoil size and/or angle of attack. The influence of varying Γ on the resulting wave amplitudes is shown in FIG. 7. The resulting wave heights scale linearly with Γ and this applies equally to all waves generated. This behavior has important implications for wave cancellation. Since a linear change in circulation causes a linear change in wave amplitude, the wave energy converter can be easily adjusted to different wave heights by changing the circulation. Physically, this can be accomplished by adjusting the hydrofoil pitch and will not cause any change in conversion efficiency because the relative proportions of all harmonic components of the generated wave scale equally.

Another factor in generation of a canceling wave is the number of blades employed. A single-blade CycWEC can create a single direction traveling wave suitable for wave cancellation as described above. However, the optimal WEC size determined by the bandwidth of the peak power ratio poses a real world engineering challenge when canceling deep ocean waves with wave lengths of the order of 100 m. This challenge can be addressed by improving the power ratio for smaller device sizes by considering a WEC with multiple hydrofoils. For example, in addition to improved cancelation of unwanted harmonics, a double-blade CycWEC can generally produce twice the height of a generated wave using the same size and similar operating parameters as a single-blade CycWEC. Further, through the principles of superposition of waves, a number of CycWECs can be serially arranged and synchronized to collectively generate the canceling wave and collectively extract nearly 100% of the incident energy from an incoming ocean wave. See above incorporated U.S. Pat. No. 7,686,583.

Figure 8:
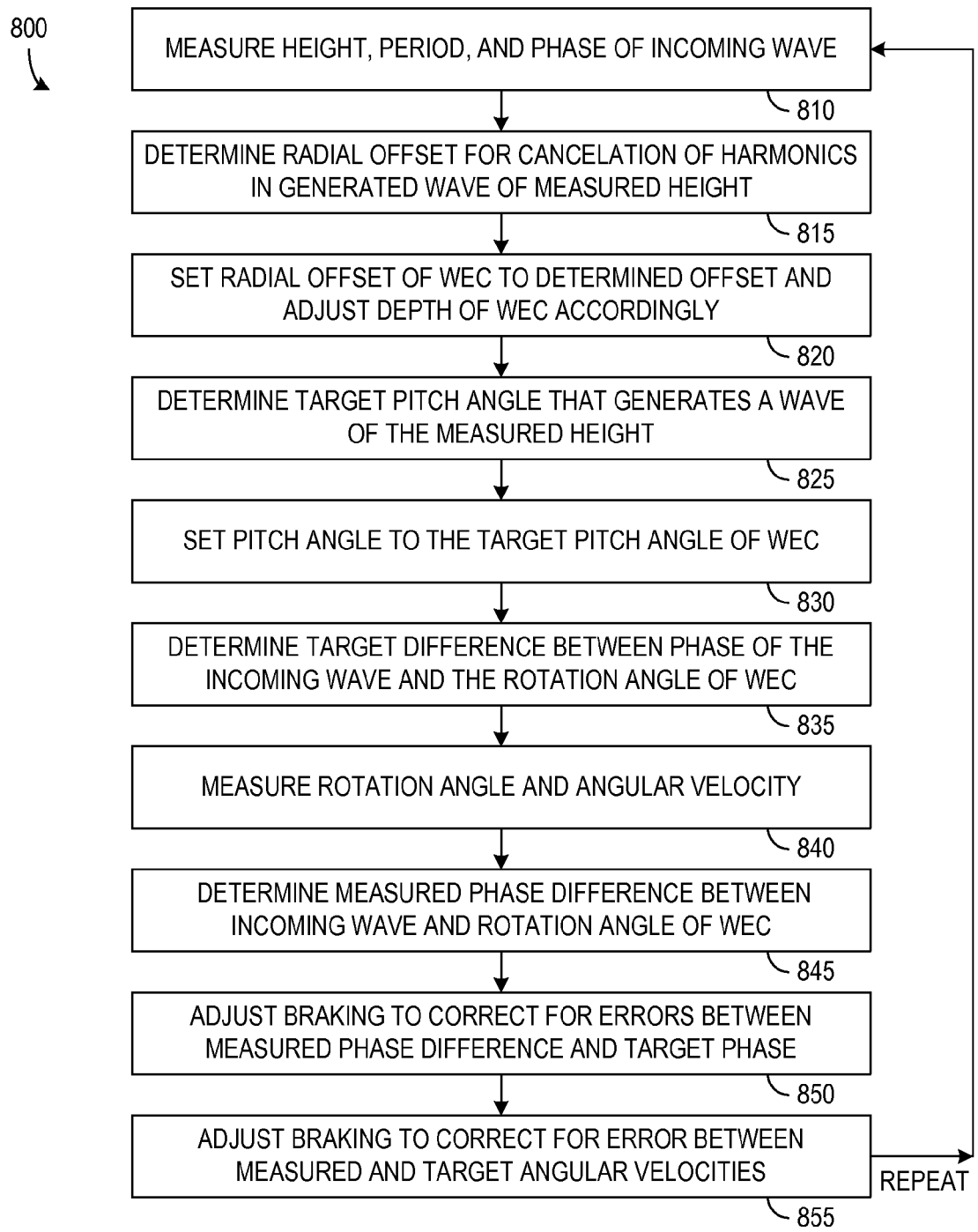
FIG. 8 is a flow diagram of a process for controlling a wave energy converter.

FIG. 8 is a flow diagram of an embodiment of a control loop 800 that can be employed in WEC system 100 or 400 of FIG. 1 or 4. Control loop 800 begins with measurement 810 of one or more of the height H, period T, wavelength $\lambda$, and phase $\phi$ of an incoming wave. If the WEC has an adjustable radial offset R, the WEC control system in a step 815 can then determine a target radial offset. As noted above, the target radial offset may be in a range, e.g., $0.3<2R/\lambda<0.5$ for a single-blade or $0.2<2R/\lambda<1.0$ for a double-blade WEC, to generate a close approximation to an Airy wave. The WEC control system in step 820 may then set the radial offset R of the WEC to the target and adjust the depth yc of the WEC according to the new size of the WEC. However, adjustment of radial offset R may not be necessary since a fixed radial offset may provide high performance over a range of wavelengths. The WEC control system in step 825 determines a target pitch angle needed to generate a wave of the measured height H with the WEC having the current radial offset R and depth yc and sets in step 830 the pitch angle or angles of the WEC according to the target pitch angle.

The WEC control system in step 835 determines a target difference between phase $\phi$ of the incoming wave and rotation angle $\theta$ of the WEC. As noted above, the target difference depends on whether the wave phase is the phase at a sensor or at the WEC and the convention used for rotation angle $\theta$. In general, the generated wave will have a peak when a hydrofoil with a negative pitch angle is directly above the main shaft and will have a trough when a hydrofoil with a positive pitch angle is directly above the main shaft. The target difference should be such that the phase of the generated wave at the WEC is 180° out of phase with the incoming wave at the same location. Measurement 840 of the rotation angle $\theta$ and angular velocity w can then be used in steps 845, 850, and 855 to control braking or drive applied to the WEC. More specifically, step 845 determines a difference between the measured phase $\phi$ and the measured rotation angle $\theta$, and determines whether there is an error between the measured difference and the target difference from step 835. The WEC control system in step 850 can adjust a load, e.g., the generator and transmission coupled to the main shaft of the WEC, to correct for any error between the measured difference and the target difference from step 835. Once the target difference is achieved, the WEC control system in step 855 can readjust the load so that the angular velocity matches the period of rotation of the WEC to the period of the incoming wave. Control loop 800 can then repeat starting with new measurements 810 of the incoming wave.

The performance of the cycloidal wave energy converters are primarily described above in nondimensional quantities that can be adapted to almost any wave conditions. However, as a concrete example, North Atlantic Ocean waves typically have a wave height H of about 3.5 m, a period T of about 9 s, and energy $P_{Airy}$ of about 108 kW m$^1$. For such an incoming wave, a desirable radial offset R is about 20 m, and the incoming wave can be entirely canceled using two hydrofoils, each producing a constant circulation $\Gamma$ of about 17 m$^2$/s. Assuming a realistic lift coefficient of about 0.75, a hydrofoil chord of about 3.25 m is required to achieve a circulation of about 17 m$^2$/s. The induced velocity ratio Urot/UW is about 11 assuming a lift to drag ratio L/D of about 40 yields an estimate of the tangential drag and thus wave energy lost to hydrofoil drag. Consequently, an estimate of the available shaft power is about 77 kW m$^{-1}$, and a blade span of only S of about 13 m would thus yield 1 MW of shaft power after subtracting the viscous losses.

As described above, a single-blade or double-blade cycloidal turbine can be used as an efficient wave maker or a wave termination device when synchronized to an incoming wave by means of feedback control. For wave generation, a single Airy type wave can be created that only travels in one direction, with no wave being generated in the other direction. The direction of travel is controlled by the rotation direction, while the wave height varies linearly with hydrofoil circulation. For a single-blade WEC, the resulting wave field in general decomposes into the fundamental wave traveling up-wave and two higher harmonics traveling both up and down-wave. One configuration for the radial offset R in such a device satisfies the equation $2R/\lambda_{Airy}=1/\pi$, which corresponds to an exact match between the hydrofoil rotational velocity and the wave speed of the generated wave. A significant improvement in the wave field may be achieved using a WEC with two hydrofoils spaced 180° apart with equal but opposite circulation. For this configuration, the harmonic waves of twice the fundamental frequency have negligible amplitudes, resulting in a significantly improved wave field for wave termination applications.

The single-sided wave generated by the cycloidal WEC is well suited to extract energy from an incoming plane Airy wave. In order to achieve this, the motion of the WEC may be synchronized in frequency and phase locked to the incoming wave, and the circulation of the converter's hydrofoils may be adjusted to produce a wave of matching amplitude by means of feedback flow control. If this is accomplished, in the two-dimensional inviscid limit, more than 99% of the incoming wave energy can be extracted from the wave achieving wave termination. The hydrofoil in this situation experiences an almost constant inflow throughout the rotation of the converter, resulting in almost constant torque and thus constant shaft power. The WEC thus functions as a fluid dynamic rectification device when considering the moving reference frame of the rotating hydrofoil, while the reactive force at the main shaft is changing direction through 360° for each revolution.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A method of operating a wave energy converter, the method comprising:
   measuring a period and a phase of incoming waves; and
   controlling rotation of a hydrofoil that is mounted on the wave energy converter at an offset from a rotation axis of the wave energy converter, wherein the rotation is controlled so that the hydrofoil rotates around the rotation axis with the period of the incoming waves and so that a difference between the phase of the incoming wave and a rotation angle of the hydrofoil is equal to a target difference.

2. The method of claim 1, wherein the target difference corresponds to the wave energy converter generating a wave that is 180° out of phase with the incoming wave.

3. The method of claim 1, wherein controlling the rotation angle comprises adjusting a torque that a load applies to the rotation axis, the torque being adjusted to compensate for an error between the target difference and the difference between the rotation angle and the phase of the incoming wave.

4. The method of claim 3, wherein once the difference between the rotation angle and the phase of the incoming wave matches the target difference, controlling rotation further comprises adjusting the torque that the load applies so that the hydrofoil rotates about the rotation axis with the period of the incoming waves.

5. The method of claim 1, further comprising repeating the measuring and controlling steps as at least part of a phase-lock process.

6. The method of claim 1, further comprising:
   measuring a height of the incoming waves;
   determining a target pitch angle from the height; and
   holding the hydrofoil at the target pitch angle as the wave energy converter rotates.

7. The method of claim 6, further comprising holding a second hydrofoil that is mounted on the wave energy converter an offset from the rotation axis at a second pitch angle as the wave energy converter rotates, wherein the second pitch angle has a magnitude equal to a magnitude of the target pitch angle and a sign opposite to that of the target pitch angle.

8. The method of claim 7, wherein the second hydrofoil is on a side of the rotation axis directly opposite to the first hydrofoil.

9. The method of claim 6, further comprising repeating the measuring, determining, and holding steps to update the target pitch as the incoming waves change.

10. The method of claim 1, further comprising:
    measuring a height of the incoming waves;
    using the height measured to determine a target offset; and
    adjusting the offset of the hydrofoil from the rotation axis to match the target offset.

11. The method of claim 10, wherein using the height measured to determine the target offset comprises selecting the target offset according to power in harmonic components of a wave that the wave energy converter would generate when the offset of the hydrofoil is equal to the target offset.

12. The method of claim 10, further comprising repeating the measuring, determining, and adjusting steps to update the target offset as the incoming waves changes.

13. A wave energy converter system, comprising:
    a sensor system positioned to measure a period and a phase of incoming waves;
    a main shaft;
    a first hydrofoil that is mounted on the main shaft at an offset, wherein a mounting of the first hydrofoil permits control of a pitch angle of the first hydrofoil; and
    a control system configured to control the rotation of the main shaft so that the hydrofoil rotates around a rotation axis of the main shaft with the period of the incoming waves and so that a difference between the phase of the incoming wave and a rotation angle of the first hydrofoil is equal to a target difference.

14. The system of claim 13, further comprising a load coupled to the main shaft, wherein the control system is further configured to control rotation by adjusting a torque that the load applies to the main shaft, and adjustment of the torque compensates for an error between the target difference and the difference between the rotation angle and the phase of the incoming wave at the wave energy converter.

15. The system of claim 14, wherein once the difference between the rotation angle and the phase of the incoming wave matches the target difference, the control system adjusts the torque that the load applies so that the first hydrofoil rotates about the rotation axis with the period of the incoming waves.

16. The system of claim 13, wherein:
    the sensor system is configured to measure a height of the incoming waves; and
    the control system is further configured to use the height in determining a target pitch angle and to control the pitch of the first hydrofoil so that the pitch of the first hydrofoil remains at the target pitch as the main shaft rotates.

17. The system of claim 16, further comprising a second hydrofoil that is mounted on the main shaft at an offset, wherein the second hydrofoil is on a side of the main shaft opposite from the first hydrofoil, and a mounting of the second hydrofoil permits control of a pitch angle of the second hydrofoil.

18. The system of claim 17, wherein the control system is further configured to control the pitch of the second hydrofoil so that the pitch of the second hydrofoil is opposite to the pitch of the first hydrofoil.

19. The system of claim 17, wherein twice the offset of the first hydrofoil from the main shaft is between 0.15 and 1.0 times a wavelength of the incoming waves.

20. The system of claim 13, wherein:
    the sensor system is configured to measure a height of the incoming waves;
    the mounting of the first hydrofoil permits control of the offset of the first hydrofoil from the main shaft, and
    the control system is configured to adjust the offset of the first hydrofoil according to the height of the incoming waves.

21. The system of claim 13, wherein twice the offset of the first hydrofoil from the main shaft is between 0.2 and 0.4 times a wavelength of the incoming waves.

22. The system of claim 14, wherein the load comprises:
    a mechanical transmission; and
    an electric generator connected through the mechanical transmission to the main shaft.

* * * * *